(No Model.)

J. CARREY.
CORN BREAKER AND CORNSTALK SHREDDER.

No. 541,964. Patented July 2, 1895.

Witnesses
Theo. L. Gatchel.
Louis G. Randall.

Inventor
John Carrey.
By John Wedderburn
his Attorney.

UNITED STATES PATENT OFFICE.

JOHN CARREY, OF DE SOTO, MISSOURI.

CORN-BREAKER AND CORNSTALK-SHREDDER.

SPECIFICATION forming part of Letters Patent No. 541,964, dated July 2, 1895.

Application filed February 21, 1895. Serial No. 539,278. (No model.)

*To all whom it may concern:*

Be it known that I, JOHN CARREY, a citizen of the United States, residing at De Soto, in the county of Jefferson and State of Missouri, have invented certain new and useful Improvements in Corn-Breakers and Cornstalk-Shredders; and I do hereby declare the following to be a full, clear, and exact description of the invention, such as will enable others skilled in the art to which it appertains to make and use the same.

My invention relates to improvements in devices for separating ears of corn from the stalk and for crushing the stalk for the purpose of producing fodder.

The invention consists essentially of the combination with a thrashing device of two feed and crushing rollers, having a series of circular depressions upon their outer surfaces and a fan for separating the light particles of dust and broken blades from the corn throwing the same back of cylinder into the shredded fodder. The said feed and crushing rolls are adapted to be used in connection with thrashing machines of ordinary construction, in which a fan is employed.

The invention is clearly illustrated in the accompanying drawings, in which—

Figure 1:
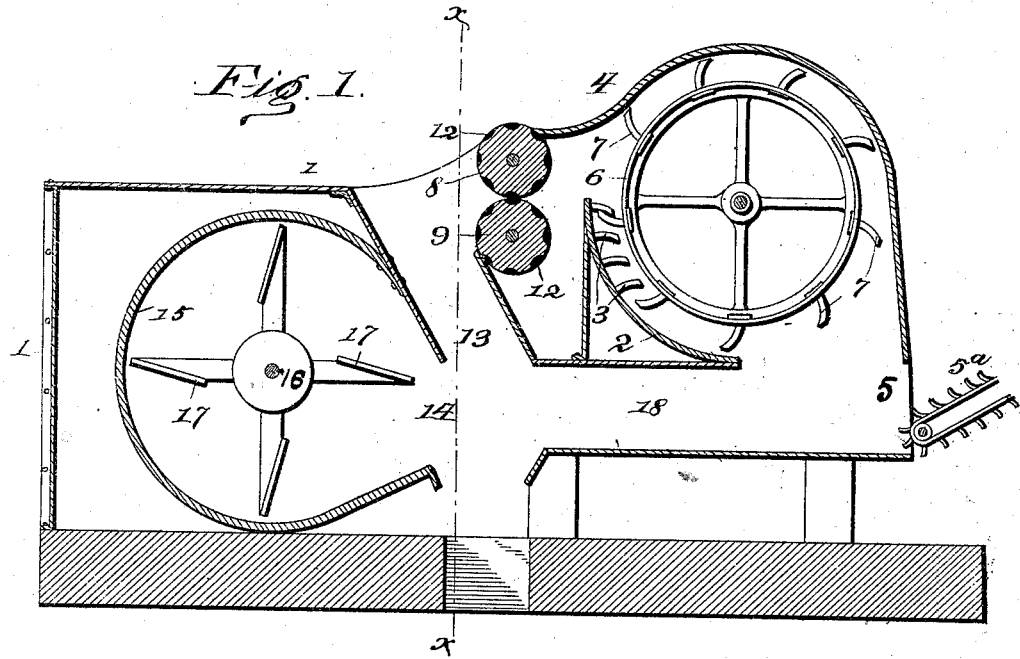
Figure 2:
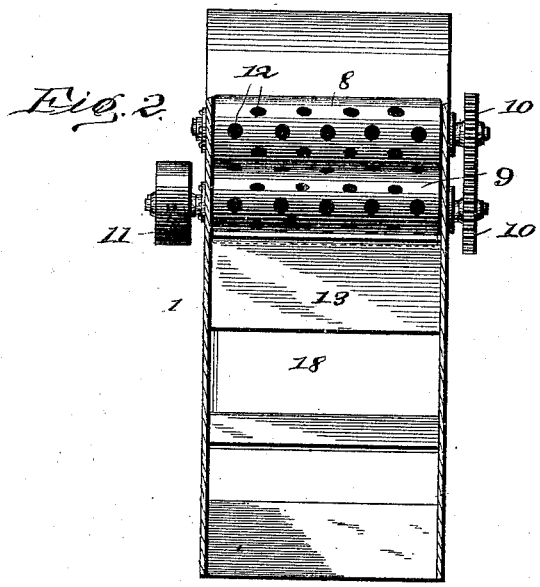

Figure 1 represents a vertical sectional view taken through the device, and Fig. 2 a section of the same on the line $x$ $x$ of Fig. 1.

Like reference numerals indicate like parts in both views.

1, represents a suitable frame work in which is supported a thrashing device which may be of any approved construction. In this it will be seen that 2, represents a concave, provided with a series of inwardly projecting teeth 3, and having an upper surrounding casing 4, with an outlet 5, extending from the lower end thereof. Leading from this outlet is an elevator 5ª, for conveying the shredded fodder to a building or other suitable place of storage.

6, represents a thrashing cylinder provided with a series of teeth 7, upon its periphery which act in conjunction with the teeth 3, of the concave 2, for the purpose which is readily understood.

8, 9 represent two feeding and crushing rolls mounted in suitable bearings in uprights forming a part of the frame 1, and provided on their outer ends with intermeshing gear wheels 10, 10, for the purpose of causing their rotation in unison. The lower roller 9, is provided upon its other end with a drum or pulley 11, through which power is applied to drive the rolls from any suitable source thereof. These rolls 8 and 9 are formed upon their outer surfaces with a series of circular depressions 12, 12, for a purpose which will appear later. From the forward part of the rolls 8, 9, leads a chute 13, which discharges into a suitable receptacle for the ears of corn. Leading into the chute is an opening 14, of the fan case 15, in which is rotatably mounted the fan shaft 16, provided with suitable blades 17, as clearly shown. A horizontal passage 18, also leads outwardly therefrom to the outlet opening 5 from the thrashing device. The stalk of corn, with the ears thereon is then fed to the feed and crushing rolls 8, 9, and by reason of the depressions 12, therein, the ears are broken off from said stalk and deposited through the chute 13, into a suitable receptacle. The stalk itself is thoroughly crushed by the rolls 8, 9, and fed into the concave 2, of the thrashing device. Here it is met by a rotating thrashing cylinder, its disintegration completed and finally discharged from the outlet opening 5, onto the elevator 5ª, and deposited into a building or other suitable place of storage. The fan causes a blast through the passage 18 which separates the light particles of dust and broken blades from the corn, throwing the same back of cylinder into the shredded fodder. The crushed stalk in the state in which it is left can be used as fodder, and experience has proven that it is most palatable to animals to which it is fed.

Having now described my invention, what I claim as new, and desire to secure by Letters Patent, is—

The combination with the inclosed casing, having a chute 13 therein and a discharge opening below said chute, of the blast fan and the horizontal blast passage 18 leading to the discharge outlet 5, the feed rolls in the rear of the chute 13, and the thrashing mechanism whereby the ears snapped from the stalk are dropped through the blast while the stalks are shredded by the thrashing device and delivered to the discharge opening, substantially as and for the purpose described.

In testimony whereof I have signed this specification in the presence of two subscribing witnesses.

JOHN CARREY.

Witnesses:
GUST. HAMEL,
O. M. MUNROE.